Feb. 13, 1940.  C. W. GIBBS  2,190,421
MIXING MACHINE
Filed July 18, 1938   3 Sheets-Sheet 1
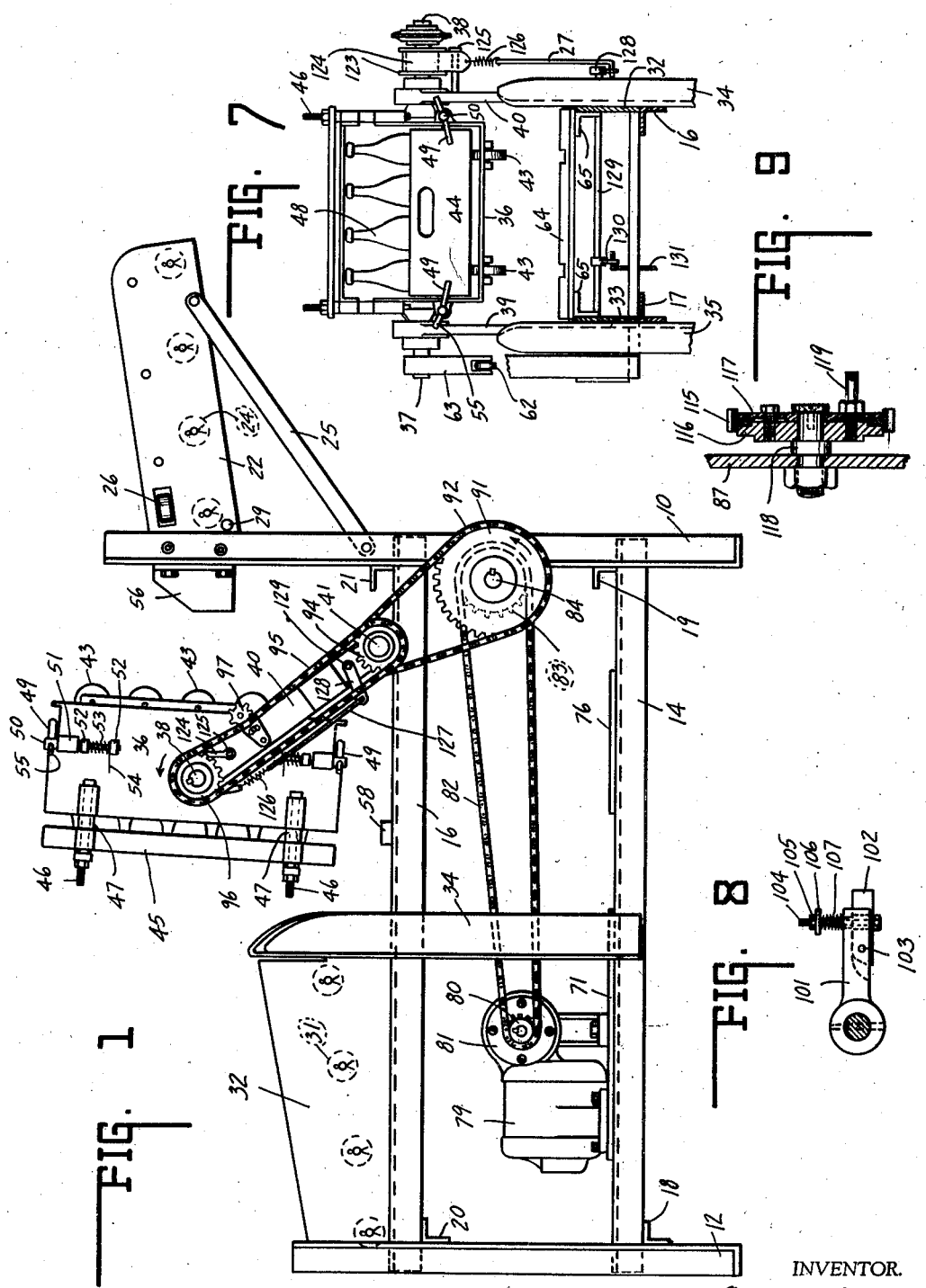
INVENTOR.
CURTIS W. GIBBS.
BY Lockwood, Goldsmith & Galt
ATTORNEYS.

Feb. 13, 1940.   C. W. GIBBS   2,190,421
MIXING MACHINE
Filed July 18, 1938   3 Sheets-Sheet 2
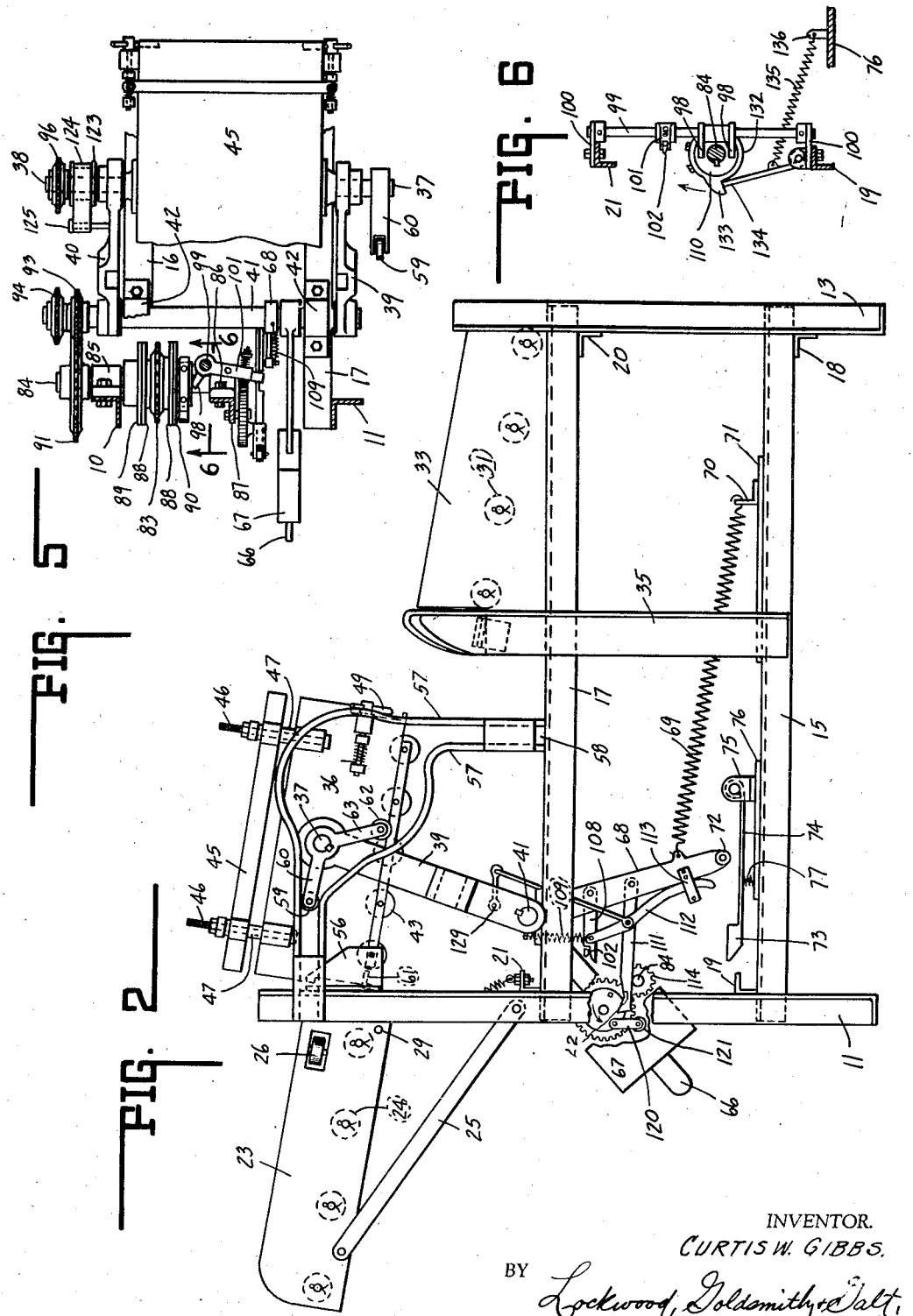
INVENTOR.
CURTIS W. GIBBS.
BY Lockwood, Goldsmith & Galt,
ATTORNEYS.

Feb. 13, 1940.                C. W. GIBBS                    2,190,421
                             MIXING MACHINE
                          Filed July 18, 1938           3 Sheets-Sheet 3
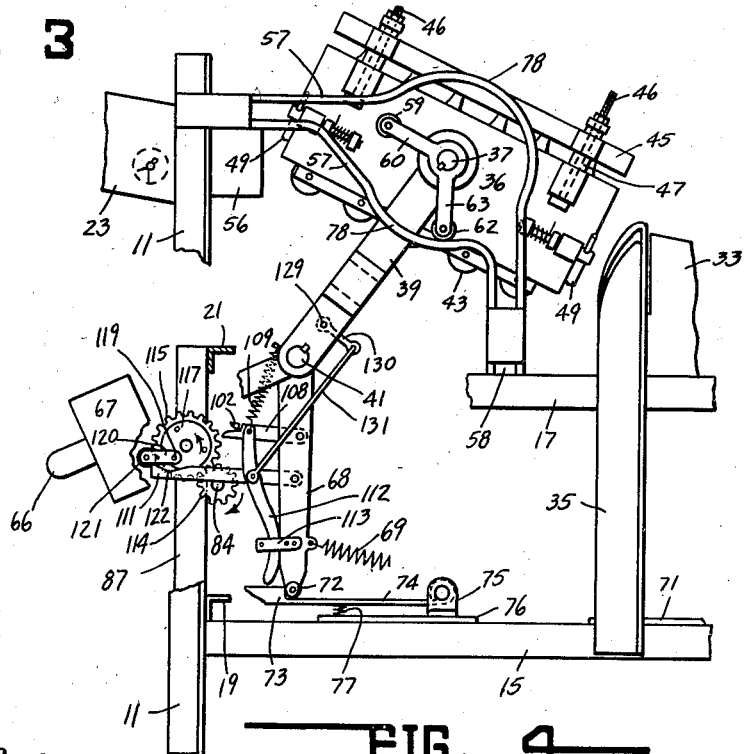
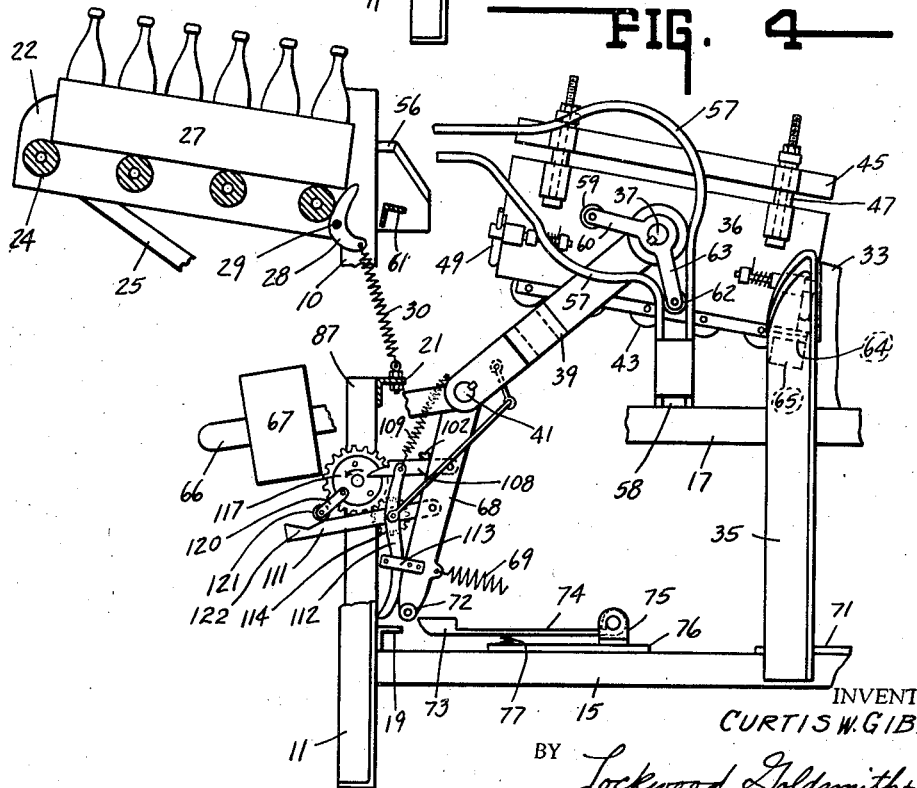
INVENTOR.
CURTIS W. GIBBS.
BY Lockwood, Goldsmith & Galt
                    ATTORNEYS.

Patented Feb. 13, 1940

2,190,421

UNITED STATES PATENT OFFICE 2,190,421

MIXING MACHINE

Curtis W. Gibbs, Fort Worth, Tex., assignor, by direct and mesne assignments, to Bottlers Equipment Company, Fort Worth, Tex., a corporation Application July 18, 1938, Serial No. 219,758

8 Claims. (Cl. 259—54)

This invention relates to a mixing machine for bottled goods and the like.

In the soft drink industry, the ingredients of a drink are normally charged separately into the individual bottles. In order that the drink may reach the customer in a uniformly homogeneous condition, it is necessary that the bottles be thoroughly agitated to mix the ingredients after charging. The mixing at the present time is usually accomplished by machines which agitate the bottles individually before they are placed in the cases ordinarily used for delivery. The capacity of such machines depends upon the number of individual bottle grasping units which are provided. A machine of this type adapted to mix the output of a modern charging machine must have a large number of such units and therefore must be a relatively large and expensive piece of apparatus.

One object of the present invention is to provide a mixing machine in which an entire case of bottles may be mixed simultaneously after they have been placed in the case. The capacity of the machine is therefore substantially the same as that of a machine having a number of mixing units equal to the number of bottles in a case, usually twenty-four. Such a machine provides more than enough capacity for mixing the output of the usual charging machine and yet requires only a single mixing unit large enough to hold a case of bottles. Compared to the present mixing machines, it is relatively simple and inexpensive.

Another object of the invention is to improve the thoroughness of mixing. This is accomplished by rotating the entire case and contents preferably through at least four revolutions.

Another object of the invention is to provide simple and practical control means for operating the machine.

Other objects and features of the invention and the full nature thereof will be apparent from the following description and claims and the attached drawings in which a preferred form thereof is shown by way of illustration.

Fig. 1 is an elevational view of one side of a mixing machine embodying the invention. Fig. 2 is a similar view of the opposite side thereof with the parts in a different position. Fig. 3 is a fragmentary elevational view similar to Fig. 2 with the parts in a different position. Fig. 4 is a similar view to Fig. 3 with the parts in still another position. Figs. 2, 3 and 4 each have parts cut away to show other parts in detail.

Fig. 5 is a plan view of a portion of the machine with parts cut away. Fig. 6 is a sectional view substantially on the line 6—6 of Fig. 5. Fig. 7 is an end elevational view partly in section of a portion of the machine. Fig. 8 is a plan view of a clutch operating lever. Fig. 9 is a sectional view in elevation of certain mechanism used for timing the operation of the machine.

In the preferred form of the invention illustrated in the drawings, the stationary frame of the machine includes corner posts 10, 11, 12 and 13, lower longitudinal members 14 and 15, upper longitudinal members 16 and 17, lower lateral members 18 and 19 and upper lateral members 20 and 21, secured together in a rigid structure.

A case receiving conveyor is provided consisting of side plates 22 and 23 secured to corner posts 10 and 11 and rollers 24 journaled on said side plates. The side plates are braced by members 25 and are provided with guide rollers 26 adapted to engage the opposite sides of a case 27 when the same is resting on rollers 24 as shown in Fig. 4. A latch 28 is pivotally mounted on a rod 29 mounted on the side plates 22 and 23 and is yieldingly held in engagement with the case 27 to hold the same in position on the rollers 24 by a tension spring 30 secured to the frame member 21.

A discharge conveyor is also provided and consists of rollers 31 journaled on side plates 32 and 33 which are secured to corner posts 12 and 13 and to vertical members 34 and 35. The vertical member 34 is secured to frame members 14 and 16 and the member 35 is secured to frame members 15 and 17.

For moving the cases from the receiving conveyor to the discharge conveyor and for mixing the contents of the bottles in transit, there is provided a box-like container 36. Said container is fitted with trunnions 37 and 38 which are journaled respectively in arms 39 and 40, both of which are keyed to a shaft 41 mounted in bearings 42 carried by frame members 16 and 17. Said shaft and the arms 39 and 40 constitute a pivotally mounted carrier upon which the container 36 is in turn pivotally mounted by means of the trunnions 37 and 38.

The container 36 is open at both ends as best seen in Fig. 7 and is provided with rollers 43 journaled on the bottom thereof and extending into the container sufficiently far to support a case 44 therein. A container cover 45 is secured to the container proper by means of bolts 46 and is properly spaced therefrom by collars 47 surrounding said bolts. The spacing is such as to provide a minimum clearance for the tops of bottles 48 of the particular size in use. For bottles of different heights, spacers 47 of different thicknesses are used.

For locking the cases in the container during transit and mixing, there are provided latches 49 at each corner of the container. Each latch 49 is mounted on a stem 50 (Figs. 1 and 7) journaled in a bearing 51 mounted on the side of the container. Each stem has collars 52 secured thereto and has a torsion spring 53 wound about the same between said collars. One end of the spring is secured to one of the collars and the opposite end 54 extends outwardly and engages the side of the container. Each latch has an outwardly projecting trigger 55. The springs 53 normally retain the latches 49 in the position shown in Fig. 7, in which position they prevent escape of the case from the container. When the container is moved by the rocking of arms 39 and 40 to the receiving position shown in Fig. 2, the triggers 55 at the left end of the container engage a pair of angle plates 56 and are pressed upwardly against the pressure of their springs 53 to throw the latches 49 downwardly out of the way of an incoming case. Said latches are immediately replaced when the triggers 55 and plates 56 become disengaged as the container is moved from the receiving position.

Similarly the triggers 55 at the opposite end of the container engage the beveled upper ends of the vertical members 34 and 35 when the container is moved to the discharge position shown in Fig. 4. The corresponding latches 49 are withdrawn thereby to permit escape of the case to the discharge container.

For guiding the container 36 to the receiving and discharge positions, there are provided guide bars 57 which are secured at one end to the corner post 11 and at the other end to a cross bar 58 secured to the upper faces of frame members 16 and 17. Said guide members cooperate with a roller 59 mounted on an arm 60 which is keyed to the trunnion 37 to guide the container 36 to the receiving position shown in Fig. 2. In the said receiving position, the edge of the container rests upon an angle bar 61 extending between the angle plates 56. As shown in Fig. 4, the guide members 57 cooperate with a roller 62 carried on an arm 63 to guide the container 36 to the discharge position. In said position the edge of the container rests upon a cross bar 64 (Fig. 7) which is secured to a pair of clip angles 65 carried by the plates 32 and 33.

The shaft 41 has secured thereto an arm 66 carrying a counterweight 67. Said shaft also has a downwardly projecting arm 68 keyed thereto and said arm has secured near the lower end a tension spring 69, the opposite end of which is secured to a clip 70 carried by a base plate 71 mounted on the frame members 14 and 15. The counterweight 67 and the spring 69 cooperate to bias the container 36 toward the receiving position. However, when a case of bottles has been placed in the container at said position, the weight of said case and its contents is sufficient to overbalance the effect of the counterweight and spring and to move the container toward the discharge position. When said case has been discharged, the container is free to return under the influence of the counterweight and spring to the receiving position.

The lower end of the arm 68 carries a roller 72 which is adapted to engage a shoulder 73 on a latch 74 at a point in the travel of the container between the receiving and discharge positions (Fig. 3). The latch 74 is pivotally mounted on a bracket 75 which is in turn mounted on a plate 76 carried by the frame members 14 and 15. The latch 74 is upwardly pressed by a spring 77 interposed between said latch and the plate 76.

The position assumed by the container 36 when its movement is stopped by latch 74, as shown in Fig. 3, may be termed the "mixing" position. In this position the trunnion 37 is concentric with arcuate portions 78 of the guide members 57. The radius of curvature of said portions is such as to cooperate with the rollers 59 and 62 to guide the container while the same is rotated on its trunnions for mixing the contents of the bottles carried therein.

The container 36 is rotated at its mixing position by means of power supplied by a motor 79 which is mounted on the plate 71 (Fig. 1). Said motor drives a sprocket 80 through suitable reduction gears carried in a housing 81. A sprocket chain 82 engages the sprocket 80 and is trained about a sprocket 83 which is freely mounted on a shaft 84. Said shaft is journaled in bearings 85 and 86 (Fig. 5) which are secured respectively to the corner post 10 and to a vertical frame member 87 which is secured to the frame members 19 and 21.

The sprocket 83 has secured thereto, or formed integrally therewith, a pair of clutch plates 88, one of which is adapted to engage a clutch plate 89 keyed to the shaft 84, and the other of which engages a clutch plate 90 which is splined to said shaft. When the clutch plate 90 is pressed against the mating plate 88 by mechanism to be described, the motor 79 may drive the shaft 84 through the frictional engagement of said clutch plates.

The shaft 84 has keyed thereto a sprocket 91 about which is trained a sprocket chain 92 which also engages a sprocket 93 freely mounted on the shaft 41. The sprocket 93 has secured thereto a second sprocket 94 also freely mounted on said shaft and having a sprocket chain 95 trained thereabout. Said chain is also trained about a sprocket 96 keyed to the trunnion 38. A sprocket 97 adjustably mounted on the arm 40 also engages said chain and may be adjusted to maintain a proper tension on the chain 95. By this means, the rotation of shaft 84 rotates the container 36.

The operation of the clutch for initiating and stopping rotation of the container 36 is controlled by a pair of fingers 98 which are secured to a vertical shaft 99 (Figs. 5 and 6). Said shaft is journaled in brackets 100 carried by the frame members 19 and 21 and has secured thereto a lever arm 101 shown in detail in Fig. 8. Said lever arm has a trigger 102 pivotally secured thereto by means of a pin 103. A bolt 104 extends through suitable openings in said lever and trigger and is fitted with a nut 105 and a washer 106. A compression spring 107 is interposed between the lever arm 101 and the washer 106 and serves to retain the parts in the position shown in Fig. 8.

In the receiving position of the parts as shown in Fig. 2, a lever 108 secured to the arm 68 engages the trigger 102. Said lever is maintained in engagement with the trigger 102 by means of a spring 109 secured thereto and secured to the hub of the arm 68, as best seen in Fig. 5. When a case has been placed in the container 36 and the same has moved to the mixing position shown in Fig. 3, the lever 108 presses the trigger 102 to the left in said figure and thus rocks the vertical shaft 99 to press the fingers 98 against the hub 110 of the clutch plate 90. The degree of pressure is controlled by the action of the spring 107 and is sufficient to frictionally engage the clutches without affecting the position to which the arm 68 may move. Thus, the rotation of the container 36 is immediately started when said container reaches the mixing position.

In order to stop the rotation of the container 36 and to permit the resumption of movement thereof toward the discharge position, there is provided apparatus now to be described. A lever 111 is pivotally mounted on the arm 68. A link 112 is pivotally connected both to the lever 108 and the lever 111 and extends downwardly in contact with the arm 68. The lower end of said link is guided by a yoke 113 secured to said arm. A gear 114 is secured to the shaft 84 and meshes with a gear ring 115. Said gear ring as best seen in Fig. 9 is clamped between plates 116 and 117 which are freely mounted on a stud 118 secured to the vertical frame member 87. Said gear ring may thus be angularly adjusted upon said plates. The plates 116 and 117 carry a pin 119 on which there is freely mounted an arm 120 carrying a roller 121 located in the plane of the lever 111.

In the operation of this portion of the apparatus, the parts assume the position shown in Fig. 2 when the container 36 is at the receiving position. In the movement to the mixing position, the end of the lever 111 strikes the arm 120 and moves it to the position shown in Fig. 3. At the same time, the rotation of the shaft 84 is started by operation of lever 108 and trigger 102. During the rotation of the container 36, the plate 117 is rotated in the direction of the arrow in Fig. 4. In the first part of this rotation, the roller 121 trails across the surface of the lever 111 and has no effect thereon. However, after the pin 119 passes through its uppermost position, the arm 120 and the roller 121 hang straight downwardly therefrom. In the continued downward movement of said arm, the roller 121 strikes a shallow depression 122 formed in the upper surface of the lever 111 and presses said lever downwardly against the action of spring 109. The downward movement of said lever presses the link 112 against the latch 74 and moves the same downwardly a sufficient distance to free the shoulder 73 from the roller 72. Thus the container is again free to travel toward the discharge position. At the same time, the downward movement of the link 112 frees the lever 108 from the trigger 102. The pressure on the clutch plates 88, 89 and 90 is thus withdrawn and the rotation of the container may be stopped.

The ratios of the several sprockets and gears are so chosen that the container 36 is given a predetermined number of revolutions, preferably four, for each revolution of the plate 117. The gear ring 115 is properly adjusted with relation to said plate so that the lever 111 is operated when said number of revolutions has been completed. Thus, when the clutches are thrown out of engagement, the roller 62 is in position to enter the portion of the guideways 57 which guides the container to the discharge position. The parts may then move to the position shown in Fig. 4 in which the roller 121 and arm 120 are pivoted to the left by the movement of the lever 111. In the return movement to the receiving position of Fig. 2, said roller rides freely upon the upper surface of said lever.

It is desirable that rotation of the container 36 be immediately stopped upon the disengagement of the clutches. For that purpose, there is provided on the trunnion 38 a brake drum 123 (Fig. 5). A brake band 124 cooperates with said drum and is anchored at one end to a pin 125 secured to the arm 40. The opposite end of the brake band has attached thereto a tension spring 126 which is attached to a link 127 (Fig. 7). Said link is pivotally connected to an arm 128 secured to a rod 129 which is journaled in the arms 39 and 40. Said rod also has secured thereto an arm 130, the end of which is pivotally connected to a link 131, having its opposite end pivotally mounted on the pivot pin connecting the lever 111 and the link 112. By means of this connection, the downward movement of the link 112 rocks the rod 129 and exerts a yielding force through spring 126 on the brake band 124. Said force immediately operates to stop rotation of the container 36 with the roller 62 in position to enter the appropriate guideway.

In the return movement of the container 36 to the receiving position, it is desirable that the container maintain a substantially constant angular position with relation to the ground in order that it may reach the receiving position with the roller 59 in position to enter its appropriate guideway. Since during this movement the shaft 84 is not restrained by the clutches, there is tendency for the container to retain its angular position with relation to the arms 39 and 40 rather than with relation to the ground and thus to rotate the shaft 84 in the reverse direction. To overcome this tendency, there is provided a ring 132 (Fig. 6) which is secured to the hub 110 of the clutch disc 90. Said ring is provided with a nose 133 engageable with a latch bar 134. Said latch bar is pivotally mounted on the frame member 19 and has secured thereto a tension spring 135, the opposite end of which is secured to a pin 136 carried by the plate 76. In the idle position of the shaft 84 the parts are as shown in Fig. 6. During the rotation of the container 36, the shaft 84 rotates in the direction of the arrow in Fig. 6 and the nose 133 may then strike the latch bar 134 at each rotation and move the same out of the way. The ratio of the sprockets 91 and 93 is so chosen that the shaft 84 makes an even number of revolutions, preferably two, while the container 36 is rotated through its predetermined number of revolutions. Thus, at the end of the predetermined rotation of the container 36, the parts have returned to the Fig. 6 position. In this position, the latch bar 37 engaging the nose 133 holds the shaft 84 against reverse rotation and the container 36 in its movement from the discharge to the receiving position, is held in a substantially constant angular position with relation to the ground.

In the operation of the apparatus, a case 27 is placed on the rollers 24 of the receiving conveyor. With the parts in the Fig. 2 position the latches 49 at the receiving end of the container 36 are out of the way. The operator may then push the case 27 with sufficient force to overcome the spring 30 and the case may then move by gravity into the container. The weight of the case and contents overbalances the counterweight 67 and spring 69 and thus moves the container to the mixing position of Fig. 3, in which position it is stopped by the engagement of roller 72 with shoulder 73. At the same time, the clutches are engaged by the action of the lever 108 on the trigger 102 and the rotation of the container and its contents is started. At the end of the predetermined rotational period, roller 121 strikes the lever 111 and the resulting operation disengages the clutches, applies the brake band 124 to the brake drum 123 to stop the rotation, and releases the latch 74 from roller 72. The container 36 then moves to the discharge position at which the proper latches 49 are released to permit the case to roll by gravity from the container to the discharge conveyor. When the case has been discharged, the action of the counterweight 67 and spring 69 returns the container to the receiving position. In the meantime, the operator has placed a second case on the receiving conveyor and may push said case into the container immediately upon its return.

While the operation has been described as being initiated by the operator in pushing the case past the latch 28, it is apparent that it may be initiated automatically if desired. By an obvious change in construction, the container itself may be made to operate the latch 28 to release the case.

It will be apparent from the foregoing specification that the operation of the machine in mixing an entire case of bottled goods is extremely simple and rapid. The goods may be given as thorough a mixing as desired by suitable adjustment of the speed of the motor 79 and the ratios of the several sprockets and gears by which the number of revolutions of the container is predetermined. It has been found in practice that four complete revolutions of the container give an extremely thorough mixing of the product and that the time required for four revolutions is sufficiently short so that the machine can more than take care of the output of a modern bottling machine. The cost of construction is much less than that of present commercial machines of comparable capacity in which the bottles are handled individually.

The foregoing specification describes the invention in one of its preferred forms. The details thereof may be varied within wide limits without departing from the scope of the invention as defined by the following claims.

The invention claimed is:

1. In a mixing machine for bottled goods, a container adapted to receive a case of said goods, said container having opposite ends open for reception and discharge of a case, latch means at each of said open ends for retaining said case therein, means for moving said container to a case receiving position, latch engaging members operating the latch means at one end of said container when the same has reached said receiving position to permit entrance of a case thereto, means for thereafter moving the container to a case discharge position and for rotating the same in transit, and latch engaging members operating the latch means at the other end of said container when the same has reached said discharge position to permit discharge of said case.

2. The combination as set forth in claim 1 characterized in that the container is placed in an inclined position at said receiving position to receive said case by gravity.

3. The combination as set forth in claim 1 characterized in that the container is placed in an inclined position at said discharge position to discharge said case by gravity.

4. In a mixing machine for bottled goods, a container adapted to receive a case of said goods, said container being movable between a case receiving position and a case discharge position, members acted upon by gravity to move said container from said discharge position to said receiving position, the weight of said members being overbalanced by the weight of a case and its contents when placed in said container, whereby said container when filled moves by gravity from said receiving position to said discharge position, and means for rotating said container when filled.

5. In a mixing machine for bottled goods, a container adapted to receive a case of said goods, said container being movable between a case receiving position and a case discharge position, means biasing said container toward said receiving position, said means being overbalanced by the weight of a case and its contents when placed in said container to move the same toward said discharge position, and means for rotating said container when filled.

6. In a mixing machine for bottled goods, a container adapted to receive a case of said goods, said container being movable between a case receiving position and a case discharge position, means biasing said container toward said receiving position, said means being overbalanced by the weight of a case and its contents when placed in said container to move the same toward said discharge position, interrupting means adapted to interrupt the latter movement short of said discharge position, power means adapted to rotate said container while said movement is interrupted, and releasing means operable upon completion of a predetermined number of revolutions to release said interrupting means to permit completion of the movement of said container to said discharge position.

7. In a mixing machine for bottled goods, a container adapted to receive a case of said goods, said container being movable between a case receiving position and a case discharge position, means biasing said container toward said receiving position, said means being overbalanced by the weight of a case and its contents when placed in said container to move the same tward said discharge position, a latch adapted to interrupt said latter movement short of said discharge position, power means for rotating said container, means actuated upon said interruption of movement to render said power means active to rotate said container, and means controlled in timed relation with the rotation of said container to stop said rotation and to trip said latch to permit completion of the movement to the discharge position.

8. In a mixing machine for bottled goods, a container adapted to receive a case of said goods, a carrier for said container, said carrier being pivotally mounted and said container being pivotally mounted on said carrier, means for rocking said carrier on its pivotal mounting to bring said container successively to a case receiving position and a case discharge position, members adapted to interrupt movement thereof from the former to the latter position, and power means for moving said container on its pivotal mounting while said first mentioned movement is interrupted.

CURTIS W. GIBBS.